US009244828B2

(12) United States Patent
Gaster et al.

(10) Patent No.: US 9,244,828 B2
(45) Date of Patent: Jan. 26, 2016

(54) ALLOCATING MEMORY AND USING THE ALLOCATED MEMORY IN A WORKGROUP IN A DISPATCHED DATA PARALLEL KERNEL

(75) Inventors: Benedict R. Gaster, Santa Cruz, CA (US); Lee W. Howes, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 986 days.

(21) Appl. No.: 13/397,391

(22) Filed: Feb. 15, 2012

(65) Prior Publication Data

US 2013/0212350 A1   Aug. 15, 2013

(51) Int. Cl.
G06F 12/02 (2006.01)
G06F 9/50 (2006.01)

(52) U.S. Cl.
CPC .......... *G06F 12/0223* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 5,675,793 A * | 10/1997 | Crick et al. | | 713/1 |
| 5,887,146 A * | 3/1999 | Baxter et al. | | 710/104 |
| 6,085,238 A * | 7/2000 | Yuasa et al. | | 709/223 |
| 6,105,039 A * | 8/2000 | Douceur et al. | | |
| 6,128,639 A * | 10/2000 | Pase | | 708/654 |
| 6,341,338 B1 * | 1/2002 | Dennie | | 711/147 |
| 6,622,301 B1 * | 9/2003 | Hirooka et al. | | 717/149 |
| 6,789,256 B1 * | 9/2004 | Kechriotis et al. | | 719/312 |
| 7,840,914 B1 * | 11/2010 | Agarwal et al. | | 716/102 |
| 2002/0032844 A1 * | 3/2002 | West | | 711/171 |
| 2002/0087813 A1 * | 7/2002 | Harris et al. | | 711/148 |
| 2002/0124144 A1 * | 9/2002 | Gharachorloo et al. | | 711/145 |
| 2002/0129208 A1 * | 9/2002 | Barroso et al. | | 711/141 |
| 2004/0194096 A1 * | 9/2004 | Armstrong et al. | | 718/100 |
| 2005/0210217 A1 * | 9/2005 | Yagi et al. | | 711/170 |
| 2006/0070069 A1 * | 3/2006 | Aguilar et al. | | 718/100 |
| 2006/0206489 A1 * | 9/2006 | Finnie et al. | | 707/10 |
| 2008/0263339 A1 * | 10/2008 | Kriegel et al. | | 712/228 |
| 2010/0198972 A1 * | 8/2010 | Umbehocker | | 709/226 |
| 2010/0241785 A1 * | 9/2010 | Chen et al. | | 711/6 |
| 2011/0078226 A1 * | 3/2011 | Baskaran et al. | | 708/607 |
| 2011/0314442 A1 * | 12/2011 | Bondhugula et al. | | 717/106 |
| 2012/0162234 A1 * | 6/2012 | Blinzer et al. | | 345/501 |

* cited by examiner

*Primary Examiner* — Edward Dudek, Jr.
*Assistant Examiner* — Christopher D Birkhimer
(74) *Attorney, Agent, or Firm* — Volpe and Koenig, P.C.

(57) ABSTRACT

In a computing system, memory may be managed by using a distributed array, which is a global set of local memory regions. A segment in the distributed array is allocated and is bound to a physical memory region. The segment is used by a workgroup in a dispatched data parallel kernel, wherein a workgroup includes one or more work items. When the distributed array is declared, parameters of the distributed array may be defined. The parameters may include an indication whether the distributed array is persistent (data written to the distributed array during one parallel dispatch is accessible by work items in a subsequent dispatch) or an indication whether the distributed array is shared (nested kernels may access the distributed array). The segment may be deallocated after it has been used.

17 Claims, 5 Drawing Sheets

ALLOCATING MEMORY AND USING THE ALLOCATED MEMORY IN A WORKGROUP IN A DISPATCHED DATA PARALLEL KERNEL

FIELD OF THE INVENTION

The present invention is generally directed to memory management in computing systems, and in particular, to using a distributed array memory structure to reduce memory management overhead.

BACKGROUND

Many programming models (for example, in graphics processing units (GPUs), heterogeneous computing systems, or embedded architectures) have to control access to multiple levels of a memory hierarchy. In a memory hierarchy, certain memories are close to where the operations happen (e.g., an arithmetic logic unit), while other memories are located farther away. These different memories have different properties, including latency and coherency. With latency, the farther away the memory is located from where the operation happens, the longer the latency. With coherency, when a memory is located closer to the chip, it may not be able to see some reads and writes in other parts of the chip. This has lead to complicated programming situations dealing with addresses in multiple memory spaces.

Container partitions in models like STAPL (Standard Template Adaptive Parallel Library for C++) or split methods in memory hierarchy languages such as Sequoia provide data splitting that allow data movement, but do not abstract temporary data in the same way. Memory spaces in programming models like OpenCL provide access to these hardware structures, but in a free-form way with no clear method for passing substructures in to and out of executing computational kernels or to provide flows of dependent blocks from one kernel instantiation to another.

A distributed array is an opaque memory type that defines a global object containing a set of local arrays, where one local array is mapped to each executing group of work instances (programmatic units of execution such as OpenCL work items, CUDA™ threads, or the instances of the body of a parallelFor execution). Each group of work instances has a higher ability for intra-group communication than inter-group communication, and hence all work instances in the group may share access to the local part of the distributed array.

SUMMARY

Abstracting multiple memory spaces may be done to improve portability (for example, when such disjoint memory spaces do not exist on a target architecture), improve compiler optimizations, support dependence tracking, and provide automated data persistence.

A distributed array is declared in terms of segments, a number of which will be allocated at run time to match the number of executing groups. Each executing group has access to its own segment. By using segments, the programmer may focus on accessing the data, rather than where the data is mapped to.

In a computing system, memory may be managed by using a distributed array, which is a global set of local memory regions. A segment in the distributed array is allocated and is bound to a physical memory region. The segment is used by a workgroup in a dispatched data parallel kernel, wherein a workgroup includes one or more work items. When the distributed array is declared, parameters of the distributed array may be defined. The parameters may include an indication whether the distributed array is persistent (data written to the distributed array during one parallel dispatch is accessible by work items in a subsequent dispatch) or an indication whether the distributed array is shared (nested kernels may access the distributed array). The segment may be deallocated after it has been used.

A computing system configured to manage memory therein includes a host configured to direct execution of a program and one or more compute devices in communication with the host. Each compute device includes a first memory and one or more compute units. Each compute unit includes a second memory and one or more processing elements. Each processing element includes a third memory and is configured to execute at least a portion of the program. The program includes instructions to: allocate a segment in a distributed array, wherein the distributed array is a global set of local memory regions; bind the segment to a physical memory region, wherein the physical memory region is any one of: the first memory, the second memory, or the third memory; and use the segment by a workgroup in a dispatched data parallel kernel, wherein a workgroup includes one or more work items.

A non-transitory computer-readable storage medium stores a set of instructions for execution by a general purpose computer to manage memory in a computing system. The set of instructions includes an allocating code segment, a binding code segment, and a using code segment. The allocating code segment allocates a segment in a distributed array, wherein the distributed array is a global set of local memory regions. The binding code segment binds the segment of the distributed array to a physical memory region. The using code segment uses the segment of the distributed array by a workgroup in a dispatched data parallel kernel, wherein a workgroup includes one or more work items.

BRIEF DESCRIPTION OF THE DRAWINGS

A more detailed understanding may be had from the following description, given by way of example in conjunction with the accompanying drawings, wherein.

DETAILED DESCRIPTION

In a heterogeneous computing system, memory may be managed by using a distributed array, which is a global set of local memory regions. To use the distributed array, it is first declared along with optional parameters. The parameters may include an indication whether the distributed array is persistent (data written to the distributed array during one parallel dispatch is accessible by work items in a subsequent dispatch) or an indication whether the distributed array is shared (meaning that nested kernels may access the distributed array). A segment in the distributed array is allocated for use and is bound to a physical memory region. The segment is used by a workgroup (including one or more work items) dispatched as part of a data parallel kernel, and may be deallocated after it has been used.

Figure 1:
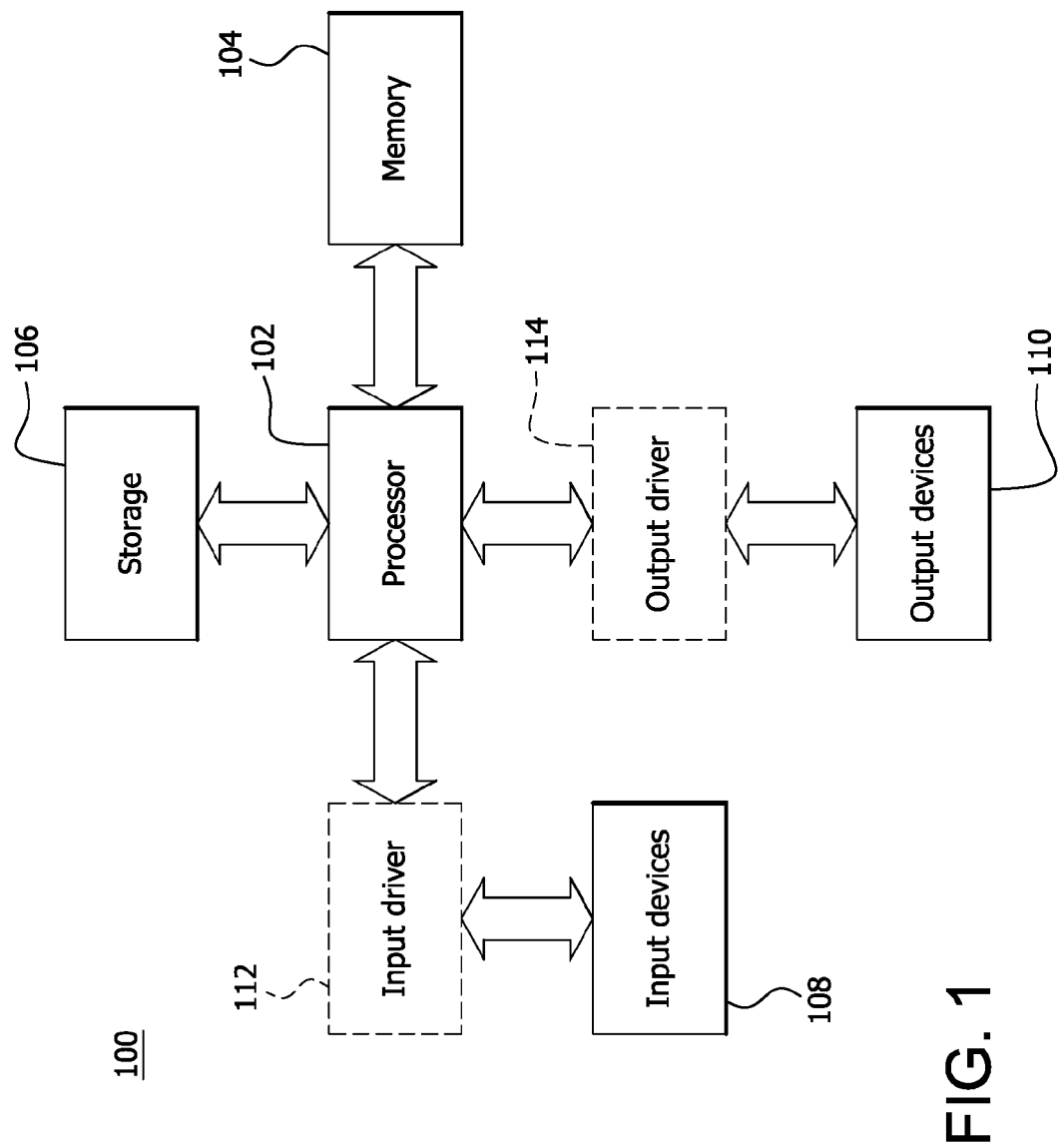
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner is the input driver 112 and the output driver 114 are not present.

Figure 2:
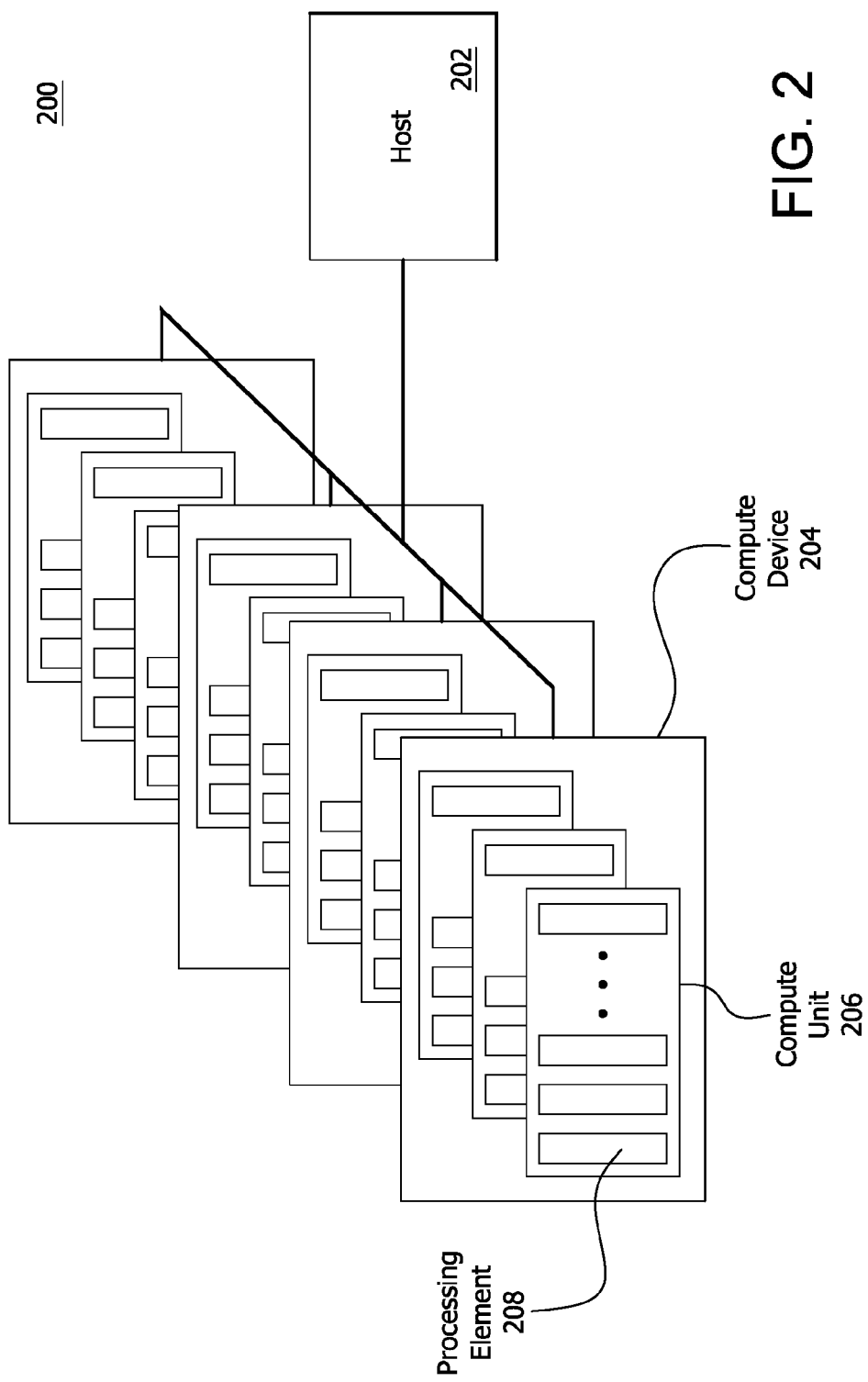
FIG. 2 is a block diagram of an exemplary heterogeneous computing system.

FIG. 2 is a block diagram of an exemplary heterogeneous computing system 200; in this example, the computing system 200 is an OpenCL modeled system. It is noted that the embodiments described herein may operate on any heterogeneous computing system, and are not limited to an OpenCL system model. The embodiments described herein are also not limited to heterogeneous computing systems, and may also be implemented on non-heterogeneous computing systems having a memory hierarchy in which some sort of control of data location is beneficial or necessary.

The computing system 200 includes a host 202 which communicates with one or more compute devices 204. Each compute device 204 includes one or more compute units 206, and each compute unit 206 includes one or more processing elements 208. It is understood that the computing system 200 may include any number of compute devices 204, compute units 206, and processing elements 208.

Figure 3:
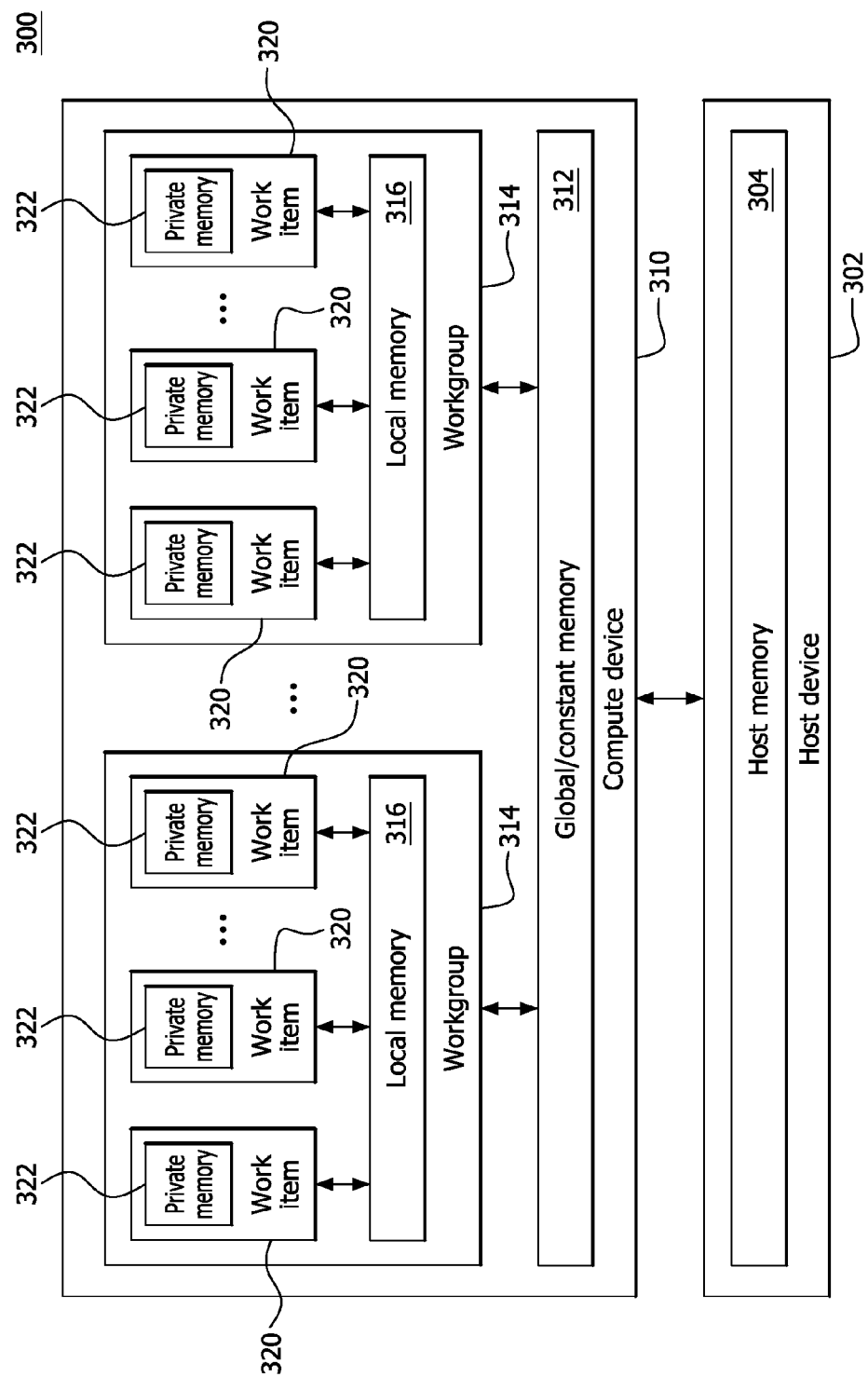
FIG. 3 is a block diagram of an exemplary memory model used in a heterogeneous computing system.

FIG. 3 is a block diagram of an exemplary memory model 300 used in a heterogeneous computing system; in this example, the memory model 300 is an OpenCL memory model. It is noted that the embodiments described herein may operate on any memory model, and are not limited to an OpenCL memory model. The memory model 300 includes a host device 302 having a host memory 304 and communicates with one or more compute devices 310. It is noted that although only one compute device is shown in FIG. 3, the memory model 300 may include multiple compute devices 310.

The compute device 310 includes a global/constant memory 312 in communication with one or more workgroups 314. While only two workgroups 314 are shown in FIG. 3, it should be understood that the compute device 310 may include any number of workgroups 314. Each workgroup 314 includes a local memory 316 in communication with one or more work items 320, each having a private memory 322. Each workgroup 314 may include any number of work items 320.

In the memory model 300, a programmer needs to ensure that the data to be accessed is in the correct location at the time it is needed. For example, the programmer needs to explicitly move data from the host memory 304 to the global/constant memory 312, the local memory 316, or the private memory 322 to be operated on. After the operations have been performed, the data must be moved back out from the global/constant memory 312, the local memory 316, or the private memory 322 to the host memory 304.

Using the local memory 316 as an example, it is mapped physically to a compute unit and logically to a group of work items 320. The work items 320 may communicate with each other through the local memory 316. The programmer has to explicitly manage the local memory 316 by copying data into it and copying data out of it. Many programming models use a pointer in this situation, and there are a limited number of compiler optimizations to assist with memory management.

A distributed array provides an abstraction through a uniform interface in terms of reads and writes, and can guarantee coherency. Accesses to memory are partitioned, such that how the user programs the memory access is how the memory access is compiled down to the machine. The properties that the programmer provides to the memory determines which physical memory it gets mapped to. The programmer does not have to specify (as under the OpenCL model) whether the memory is global, local, or private. The implementation of the distributed array maps to these different memory types because it is optimized to the hardware that is present and to where a work item is dispatched.

With the distributed array, memory may be defined to be persistent, such that it is loaded into local regions and can be stored back out again to more permanent storage if needed. The distributed array may be made persistent if the next workgroup needs this same data; for example, if the output of one workgroup is the input to the next workgroup. Workgroups may be scheduled to run on the same core, so that the workgroups can access the memory and eliminate the copy in/copy out overhead for later workgroups.

The distributed array is described in terms of segments, wherein the distributed array is a representation of a global set of all local memory regions. When bound to a parallel kernel launch, each segment of the distributed array can be accessed from one defined subgroup of the overall parallel launch, including a subset of individual work items. In the described embodiment, the subset would be the parallel workgroup within the overall parallel dispatch. Access from outside that subgroup may or may not be possible depending on defined behavior. The segment may be allocated at run time, or may be persistent due to a previous execution. If a segment is allocated, that segment may be explicitly passed into another launch, so a particular block of data can be identified and passed to a particular consuming task.

With the distributed array, it is possible to perform a depth-first optimization, in which all consecutive work that relies on one particular block of data is run before moving on to the next block of data. The distributed array is used instead of the current OpenCL-style memory model, with a large data parallel operation that writes a large amount of data to memory, reads a large amount of data back in, and so on. The depth-first optimization changes the order of execution based on the data dependencies, rather than the original data parallel construction, and allows for a more flexible execution pattern.

The following program code examples illustrate various features of using the distributed array in a heterogeneous computing system. An advantage of distributed arrays is in the explicit declaration of the segment. The following code example shows a task (a parallelFor loop) that takes a distributed array as input.

```
AMD::DistArray distArray;
distArray.allocSegment<double, sizeof(double[BLOCK_SIZE]
[BLOCK_SIZE])>();
distArray.allocSegment<double, sizeof(double[BLOCK_SIZE]
[BLOCK_SIZE])>();
```

The above portion of the code allocates a distributed array (a container with "some memory" associated with it) and creates two segments, wherein a segment is an allocation within the distributed array.

```
AMD::parallelFor(
   AMD::Range<2,2>(WC, HC,
   AMD::Range<2>(BLOCK_SIZE,BLOCK_SIZE)),
   distArray,
   [A,B,C] (opp::Index<2,2> index, AMD::DistArray& distArray) -> void
   {
```

In the above portion of the code, the distributed array is bound to a physical memory region and is passed to the body of the parallelFor loop.

```
AMD::Segment<double,sizeof(double[BLOCK_SIZE] [BLOCK_SIZE])>
   AS = distArray.getSegment<double,sizeof(double[BLOCK_SIZE]
   [BLOCK_SIZE]
)>(0);
   AMD::Segment<double,sizeof(double[BLOCK_SIZE] [BLOCK_SIZE])>
   BS = distArray.getSegment<double,sizeof(double[BLOCK_SIZE]
   [BLOCK_SIZE]
)>(1);
```

The above section of code gets the segments. When the kernel (here, the body of the parallelFor loop) is executed, the segments are bound (i.e., mapped) to physical memory. The runtime and the implementation decide exactly when the segments are bound.

```
   ...
   indX and indY have some value
   AS(indY, indX) = (*A) [a + WAA * indY + indX];
   BS(indY, indX) = (*B) [b + WBB * indY + indX];
   ...
   });
```

The above section of code obtains a handle (AS, BS) to the memory so that the code can access the memory directly.

Figure 4:
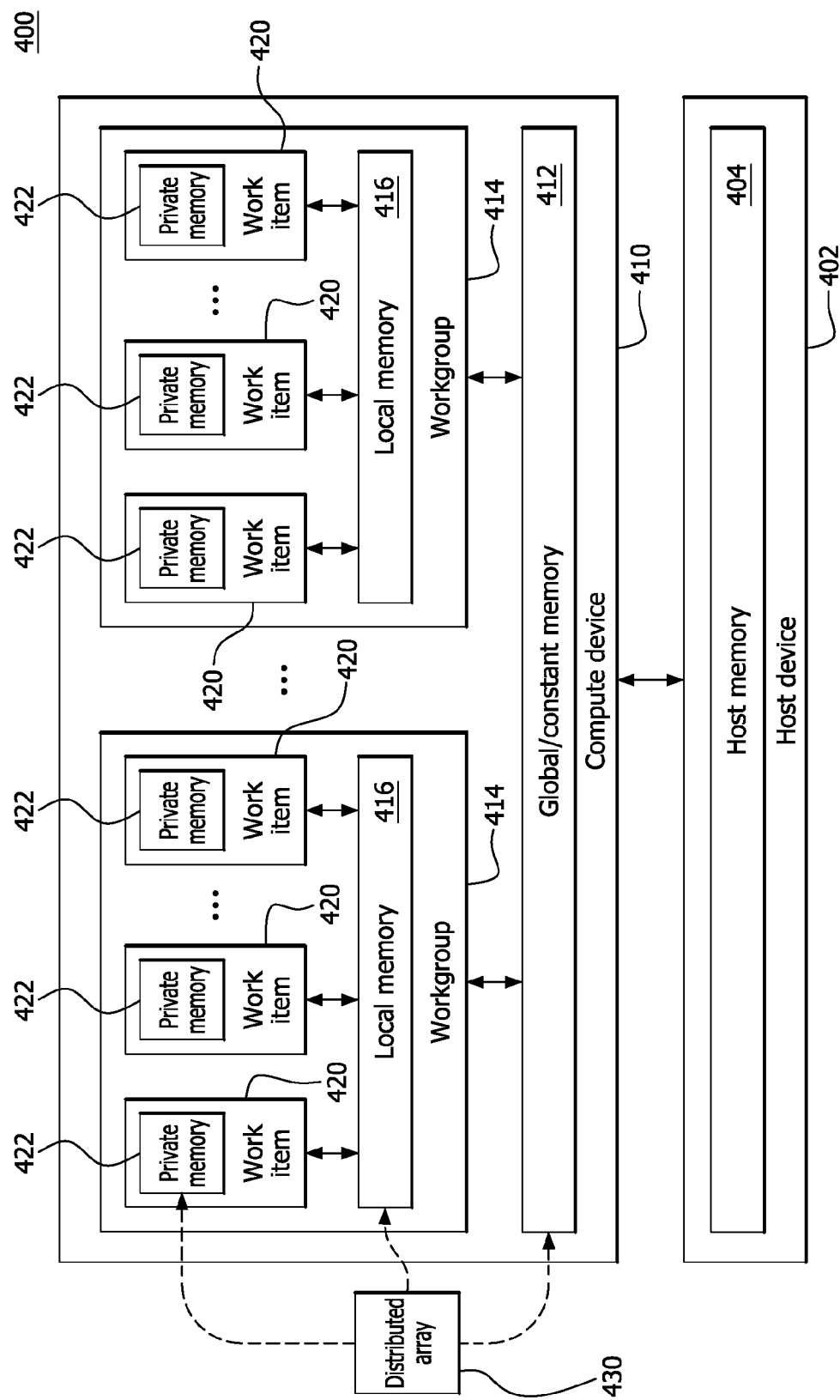
FIG. 4 is a block diagram of a memory model showing how the distributed array may map to physical memory.

FIG. 4 is a block diagram of a memory model 400 showing how the distributed array may map to physical memory. The memory model 400 includes a host device 402 having a host memory 404 and communicates with one or more compute devices 410. It is noted that although only one compute device is shown in FIG. 4, the memory model 400 may include multiple compute devices 410.

The compute device 410 includes a global/constant memory 412 in communication with one or more workgroups 414. While only two workgroups 414 are shown in FIG. 4, it should be understood that the compute device 410 may include any number of workgroups 414. Each workgroup 414 includes a local memory 416 in communication with one or more work items 420, each having a private memory 422. Each workgroup 414 may include any number of work items 420.

When a distributed array 430 is allocated, it may be mapped to the global/constant memory 412, the local memory 416, or the private memory 422, depending on the implementation. It is noted that the memory model 400 is one example memory model, and in different memory models, the distributed array 430 may be similarly mapped to different memories in different locations.

The following program code example uses two segments of a distributed array, each of which will be viewed differently for each group of work items (a work item is the body of the loop, and the workgroups are defined by the variable BLOCK_SIZE). In this example, the data is a communication buffer (which is fairly abstract) and uses two parallelFor dispatches in succession that take the same distributed array. The first parallelFor loop updates the distributed array, while the second parallelFor loop uses those same values.

AMD::DistArray distArray <persistent>;

The above line of code indicates whether the segment is persistent when the distributed array is allocated. This is an explicit declaration; if not made, then the segment is not persistent. Other parameter options may be used to achieve a similar result, for example: persistent, accessible across workgroups, etc. These parameters allow the memory placement and accesses to be accelerated by hardware.

If a segment is not identified as persistent, then its data only has meaning for the duration of the single parallelFor loop (as in this example). If the segment is not persistent, then after the code executes, those values are lost (i.e., not written back out to memory). A non-persistent segment can be used to store temporary values to optimize memory accesses.

If a segment is marked as persistent, then the same data may be used afterwards. The segment is persistent for the duration of whatever execution it is bound to. The segment can be written to and read by that execution, but is not guaranteed to be accessible from the next unit of execution it is bound to. Hence, it is treated as a scratchpad memory. If the segment is persistent, the runtime can guarantee to write the data out and read it back in, such that the data is accessible to consecutive executions. A scalar kernel could similarly utilize scratchpad memory, like the parallelFor loop in this example. The allocation may not be per kernel, but the mapping to specific hardware regions and the lifetime of the data would be per kernel launch. Alternatively, the system may write the data out at the end of the kernel and the reload it for the next kernel.

```
    distArray.allocSegment<double,sizeof(double[BLOCK_SIZE] [BLOCK_SIZE] )>(
);
    distArray.allocSegment<double,sizeof(double[BLOCK_SIZE] [BLOCK_SIZE] ) >(
);
    AMD::parallelFor(
        AMD::Range<2,2>(WC, HC, AMD::Range<2>(BLOCK_SIZE,BLOCK_SIZE)),
        distArray,
        [A,B,C] (opp::Index<2,2> index, AMD::DistArray& distArray) - >
void {
        AMD::Segment<double,sizeof(double[BLOCK_SIZE] [BLOCK_SIZE]) > AS =
        distArray.getSegment<double,sizeof(double[BLOCK_SIZE] [BLOCK_SIZE])
        >(0) ;
        AMD::Segment<double,sizeof(double[BLOCK_SIZE] [BLOCK_SIZE])> BS =
        distArray.getSegment<double,sizeof(double[BLOCK_SIZE] [BLOCK_SIZE]
        )>(1);
        ...
        indX and indY have some value
        AS(indY, indX) = (*A) [a + WAA * indY + indX];
        BS(indY, indX) = (*B) [b + WBB * indY + indX];
        ...
    } );
    AMD::parallelFor(
        AMD::Range<2,2>(WC, HC, AMD::Range<2>(BLOCK_SIZE,BLOCK_SIZE)) ,
        distArray,
        [A,B,C] (opp::Index<2,2>index, AMD::DistArray& distArray) -> void
{
        AMD::Segment<double,sizeof (double[BLOCK_SIZE] [BLOCK_SIZE]) >AS =
        distArray.getSegment<double,sizeof(double[BLOCK_SIZE] [BLOCK_SIZE]
        )>(0);
        AMD::Segment<double,sizeof(double[BLOCK_SIZE] [BLOCK_SIZE]) BS =
        distArray.getSegment<double,sizeof(double[BLOCK_SIZE] [BLOCK_SIZE]
        )>(1);
        ...
        indX and indY have some value
        AS(indY, indX) = (*A) [a + WAA * indY + indX];
        BS(indY, indX) = (*B) [b + WBB * indY + indX];
        ...
    } );
```

The distributed array may still be merely an abstraction for an intra-group communication buffer. The distributed array may be parameterized to be persistent (as described above) and pass the same data from one launch to the next, possibly with true hardware persistence. Alternatively, the persistence may be achieved by writing the data out to a DRAM buffer and reading it back in in the next launch.

The following code example shows reusing the distributed array by enqueueing a second task from within a first task. If the distributed array is bound to memory that is only visible to one compute unit, then any nested code would have to be run on the same compute unit, so the memory is still visible. Alternatively, the system would have to manage copying the data around (while less efficient, this could still be done). Nested loops, as used in this example, induce such an affinity of execution. A parameter could be added to the first line of code (e.g., during initialization of the distributed array) to indicate this property, so that the memory is visible across multiple parts of the chip. Examples of this affinity parameter include: shared, nested, or nested parallel.

```
AMD::DistArray distArray <shared>;
distArray.allocSegment<double,sizeof(double[BLOCK_SIZE][BLOCK_SIZE])>( )
distArray.allocSegment<double,sizeof(double[BLOCK_SIZE][BLOCK_SIZE])>( )
AMD::parallelFor(
    AMD::Range<2,2>(WC,HC,AMD::Range<2>(BLOCK_SIZE,BLOCK_SIZE)),
    distArray,
    [A,B,C] (opp::Index<2,2>index, AMD::DistArray& distArray) -> void
{
    AMD::Segment<double,sizeof(double[BLOCK_SIZE][BLOCK_SIZE]) >AS =
    distArray.getSegment<double,sizeof(double[BLOCK_SIZE][BLOCK_SIZE]
    )>(0);
    AMD::Segment<double,sizeof(double[BLOCK_SIZE][BLOCK_SIZE]) >BS =
    distArray.getSegment<double,sizeof(double[BLOCK_SIZE][BLOCK_SIZE]
    )>(1);
    ...
    indX and indY have some value
    AS(indY, indX) = (*A) [a + WAA * indY + indX];
    BS(indY, indX) = (*B) [b + WBB * indY + indX];
    AMD::parallelFor(
        AMD::Range<2,2>(WC, HC, AMD::Range<2> (BLOCK_SIZE,
        BLOCK SIZE)),
        distArray,
```

```
    [A,B,C] (opp::Index<2,2>index, AMD::DistArray& distArray) -
>void {
        ...
        } );
    ...
    } );
```

If the distributed array is specified as being persistent and shared, then optimizations such as a depth-first execution may be performed. If the distributed array is not specified as being persistent and shared, the data does not have the required lifetime or memory region affinity to be maintained for the subsequent kernel dispatch. If the data is mapped to a given memory region and marked as shared, then the subsequent workgroup might be launched on the same core and have access to the data without leaving the current memory hierarchy level.

In this case, for example, 100 groups in each parallelFor loop are launched (WC and HC both are 100×BLOCK_SIZE), but the machine can only run 20 loops concurrently. To optimize performance, the runtime might then launch 20 groups of the outer parallelFor loop. On reaching the inner parallelFor loop launch, the runtime then launches 20 groups for each of the inner parallelFor loops until all of the inner parallelFor loops have completed, only then returning to the next set of groups from the outer parallelFor loop. The information encapsulated in the distributed array enables this sort of optimization.

The above example is more specific, by indicating that the inner parallelFor will execute on precisely the local group's segment (segment AS). That is, the inner parallelFor loop is being launched pre-bound. In this fashion, the code specifies that the inner parallelFor loop's execution must execute on the same processing element as the group of the outer parallelFor loop's execution. Through the data description, computational affinity to processors may be achieved.

Figure 5:
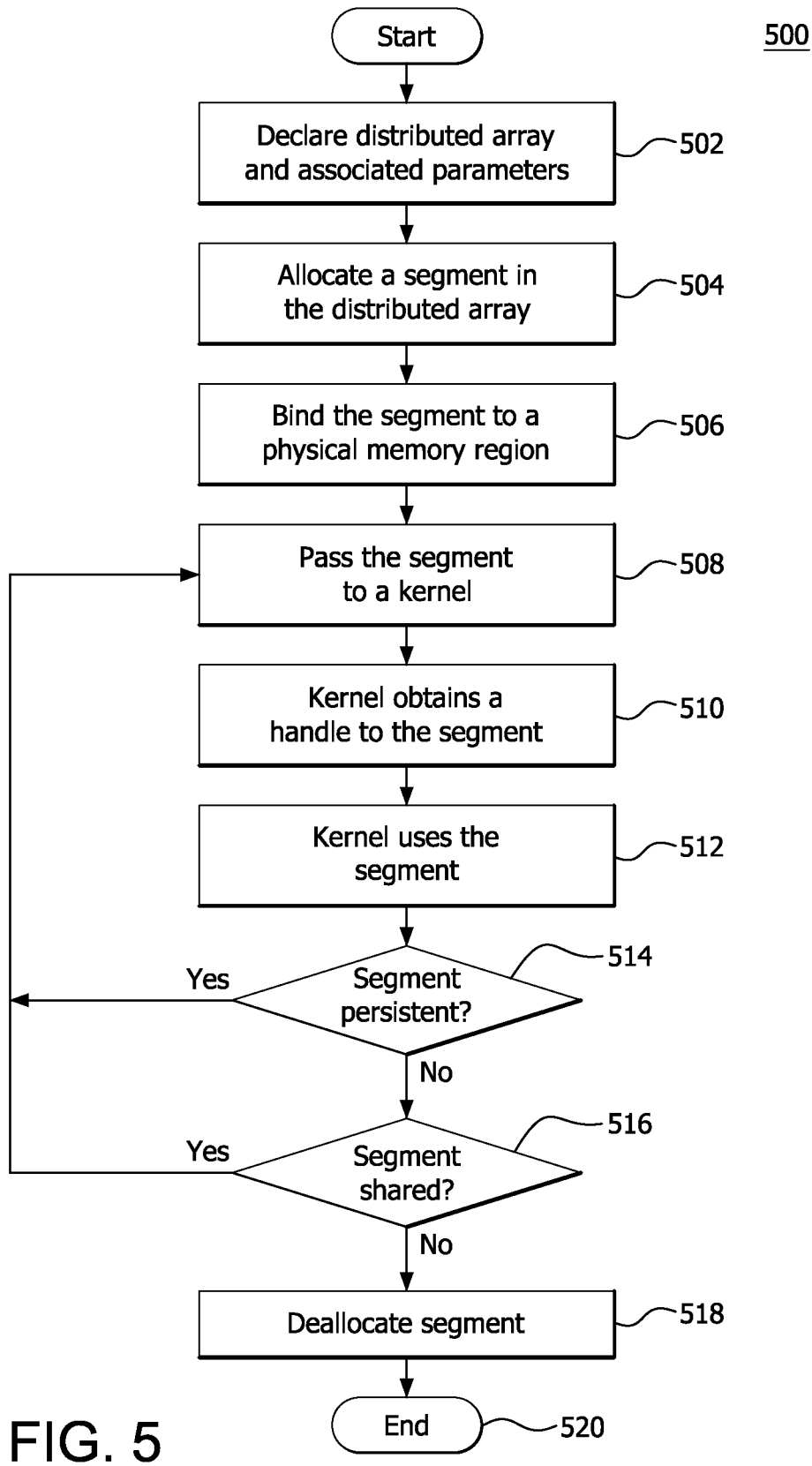
FIG. 5 is a flow diagram of a method for allocating and using a distributed array.

FIG. 5 is a flow diagram of a method 500 for allocating and using a distributed array. It is noted that the method 500 is one example of how the distributed array may be allocated and used in a heterogeneous computing system, and other methods of allocating and using the distributed array are possible.

The method 500 begins by declaring the distributed array and any associated parameters (step 502). A segment in the distributed array is allocated (step 504) and is bound to a physical memory region (step 506). The segment is passed to a kernel (step 508), the kernel obtains a handle to the segment (step 510), and the kernel uses the segment (step 512).

After the kernel has completed using the segment, a determination is made whether the segment is persistent (step

```
AMD::DistArray distArray <persistent, shared>;
    distArray.allocSegment<double,sizeof(double[BLOCK_SIZE]
    [BLOCK SIZE])>( );
    distArray.allocSegment<double,sizeof(double[BLOCK_SIZE]
    [BLOCK SIZE] ) >( );
AMD::parallelFor(
    AMD::Range< 2,2>(WC, HC, AMD::Range<2>(BLOCK_SIZE,BLOCK_SIZE)),
    distArray,
    [A,B,C] (opp::Index<2,2>index, AMD::DistArray& distArray) ->void
{
    AMD::Segment<double,sizeof(double[BLOCK_SIZE][BLOCK_SIZE])> AS =
    distArray.getSegment<double,sizeof(double[BLOCK_SIZE][BLOCK_SIZE]
)>(0);
    AMD::Segment<double,sizeof(double[BLOCK_SIZE][BLOCK_SIZE])> BS =
    distArray.getSegment<double,sizeof(double[BLOCK_SIZE][BLOCK_SIZE]
)>(1);
...
indX and indY have some value
AS (indY, indX) = (*A) [a + WAA * indY + indX];
BS (indY, indX) = (*B) [b + WBB * indY + indX];
AMD::parallelFor(
    AMD::Range<2,2>(WC, HC, AMD::Range<2>(BLOCK_SIZE,
    BLOCK SIZE)),
    distArray,
    [A,B,C] (opp::Index<2,2> index,
    AMD::Segment<double,sizeof(double[BLOCK_SIZE][BLOCK_SIZE])
    AS) -> void {
    ...
    } );
...
} );
```

In this example, the nested parallelFor loop is interested in only one particular segment, which is specifically passed. It is noted that in some implementations, the segments may be mapped to different memories. In one implementation, the shared segment is mapped to a memory that is visible across the whole chip, while the other segment is mapped to a memory near where its associated code is running (for example, a current workgroup).

514). If the segment is persistent, then the segment is passed to another kernel (step 508) and the method 500 continues as described above. If the segment is not persistent (step 514), then a determination is made whether the segment is shared (step 516). If the segment is shared, then the segment is passed to another kernel (step 508) and the method 500 continues as described above. If the segment is not shared (step 516), then the segment is deallocated (step 518) and the method terminates (step 520). It is noted that determining whether the segment is persistent (step 514) and whether the segment is shared (step 516) may be performed in any order without affecting the operation of the method 500.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing memory in a computing system, comprising:
    allocating a segment in a distributed array to an executing workgroup of a plurality of work-item groups each comprising one or more work items, wherein the distributed array is a global set of local memory regions;
    binding the segment to a physical memory region when a dispatched data parallel kernel is executed; and
    using, by the workgroup, the segment in the dispatched data parallel kernel by acquiring an identifier to the physical memory region bound to the segment.

2. The method according to claim 1, wherein the physical memory region is located near where the segment is used.

3. The method according to claim 1, further comprising: declaring the distributed array.

4. The method according to claim 3, wherein the declaring includes defining parameters of the distributed array.

5. The method according to claim 4, wherein the parameters include at least one of: an indication whether the distributed array is persistent, in which data written to the distributed array during one parallel dispatch is accessible by work items in a subsequent dispatch, or an indication whether the distributed array is shared, in which nested kernels access the distributed array.

6. The method according to claim 5, wherein if the distributed array is persistent or shared, the method further comprising:
    using the segment by a second dispatched data parallel kernel after the dispatched data parallel kernel has completed using the segment.

7. The method according to claim 5, wherein if the distributed array is persistent and shared, the method further comprising:
    using the segment by nested dispatched data parallel kernels on a single compute unit.

8. The method according to claim 1, further comprising:
    deallocating the segment after the dispatched data parallel kernel has completed using the segment.

9. A computing system configured to manage memory therein, the computing system comprising:
    a host configured to direct execution of a program;
    one or more compute devices in communication with the host, each compute device including a first memory and one or more compute units, each compute unit including a second memory and one or more processing elements, each processing element including a third memory and is configured to execute at least a portion of the program;
    wherein the program includes instructions to:
        allocate a segment in a distributed array to an executing workgroup of a plurality of work-item groups each comprising one or more work items, wherein the distributed array is a global set of local memory regions;
        bind the segment to a physical memory region when a dispatched data parallel kernel is executed; and
        use, by the workgroup, the segment in the dispatched data parallel kernel by acquiring an identifier to the physical memory region bound to the segment.

10. The computing system according to claim 9, wherein the program further includes instructions to:
    declare the distributed array.

11. A non-transitory computer-readable storage medium storing a set of instructions for execution by a general purpose computer to manage memory in a computing system, the set of instructions comprising:
    an allocating code segment for allocating a segment in a distributed array to an executing workgroup of a plurality of work-item groups each comprising one or more work items, wherein the distributed array is a global set of local memory regions;
    a binding code segment for binding the segment of the distributed array to a physical memory region when a dispatched data parallel kernel is executed; and
    a using code segment for using, by the workgroup, the segment of the distributed array in the dispatched data parallel kernel by acquiring an identifier to the physical memory region bound to the segments.

12. The non-transitory computer-readable storage medium according to claim 11, further comprising:
    a declaring code segment for declaring the distributed array.

13. The non-transitory computer-readable storage medium according to claim 12, wherein the declaring code segment includes a defining code segment for defining parameters of the distributed array.

14. The non-transitory computer-readable storage medium according to claim 13, wherein the parameters include at least one of: an indication whether the distributed array is persistent, in which data written to the distributed array during one parallel dispatch is accessible by work items in a subsequent dispatch, or an indication whether the distributed array is shared, in which nested kernels access the distributed array.

15. The non-transitory computer-readable storage medium according to claim 14, wherein if the distributed array is persistent or shared, the set of instructions further comprising:
   a second using code segment for using the segment of the distributed array by a second dispatched data parallel kernel after the dispatched data parallel kernel has completed using the segment of the distributed array.

16. The non-transitory computer-readable storage medium according to claim 14, wherein if the distributed array is persistent and shared, the set of instructions further comprising:
   a second using code segment for using the segment of the distributed array by nested dispatched data parallel kernels on a single compute unit.

17. The non-transitory computer-readable storage medium according to claim 11, further comprising:
   a deallocating code segment for deallocating the segment of the distributed array after the dispatched data parallel kernel has completed using the segment of the distributed array.

* * * * *